United States Patent
Etou

(10) Patent No.: US 10,228,676 B2
(45) Date of Patent: Mar. 12, 2019

(54) SERVO CONTROL DEVICE

(71) Applicant: FANUC Corporation, Yamanashi (JP)

(72) Inventor: Kouichi Etou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/353,821

(22) Filed: Nov. 17, 2016

(65) Prior Publication Data

US 2017/0146974 A1    May 25, 2017

(30) Foreign Application Priority Data

Nov. 20, 2015 (JP) .................. 2015-227336

(51) Int. Cl.
| | | |
|---|---|---|
| G05B 7/00 | (2006.01) | |
| G05B 19/19 | (2006.01) | |
| G05B 19/402 | (2006.01) | |
| G05B 19/404 | (2006.01) | |
| G05B 19/416 | (2006.01) | |

(52) U.S. Cl.
CPC ......... *G05B 19/402* (2013.01); *G05B 19/404* (2013.01); *G05B 19/416* (2013.01); *G05B 2219/39283* (2013.01); *G05B 2219/42076* (2013.01); *G05B 2219/42084* (2013.01); *G05B 2219/43117* (2013.01)

(58) Field of Classification Search
None
See application file for complete search history.

(56) References Cited

U.S. PATENT DOCUMENTS 4,988,935 A * 1/1991 York .................. G05B 19/232
                                                                318/561
2007/0138989 A1   6/2007 Iwashita et al.
(Continued)

FOREIGN PATENT DOCUMENTS

| CN | 1987701 A | 6/2007 |
|---|---|---|
| JP | 7-13629 A | 1/1995 |

(Continued)

OTHER PUBLICATIONS

Office Action in JP Application No. 2015-227336, dated Oct. 31, 2017, 8 pp.

*Primary Examiner* — Bentsu Ro
*Assistant Examiner* — Zemenay Truneh
(74) *Attorney, Agent, or Firm* — Hauptman Ham, LLP

(57) ABSTRACT

A servo control device according to the present invention performs speed control or torque control for controlling speed or torque of a servo motor based on a speed command or a torque command by an analog input voltage, and performs positional control for controlling a position of the servo motor based on feedback from the servo motor, includes a command switching unit determining that a command voltage by the analog input voltage enters a dead zone of the command voltage which is registered in advance and determined as stopping, and when detecting that the command voltage enters the dead zone, the command switching unit ceases the speed control or the torque control to perform deceleration stop by the positional control by distribution processing of a movement command regarding an actual speed when the speed control or the torque control is ceased as an initial speed.

4 Claims, 3 Drawing Sheets

(56) References Cited

U.S. PATENT DOCUMENTS

2007/0145931 A1 6/2007 Onishi et al.
2009/0009126 A1* 1/2009 Hishikawa ........... G05B 19/416
                                                       318/600

FOREIGN PATENT DOCUMENTS

| JP | 63-49909 A | 3/1998 |
| JP | H1115531 A | 1/1999 |
| JP | 2007-172394 A | 7/2007 |

* cited by examiner

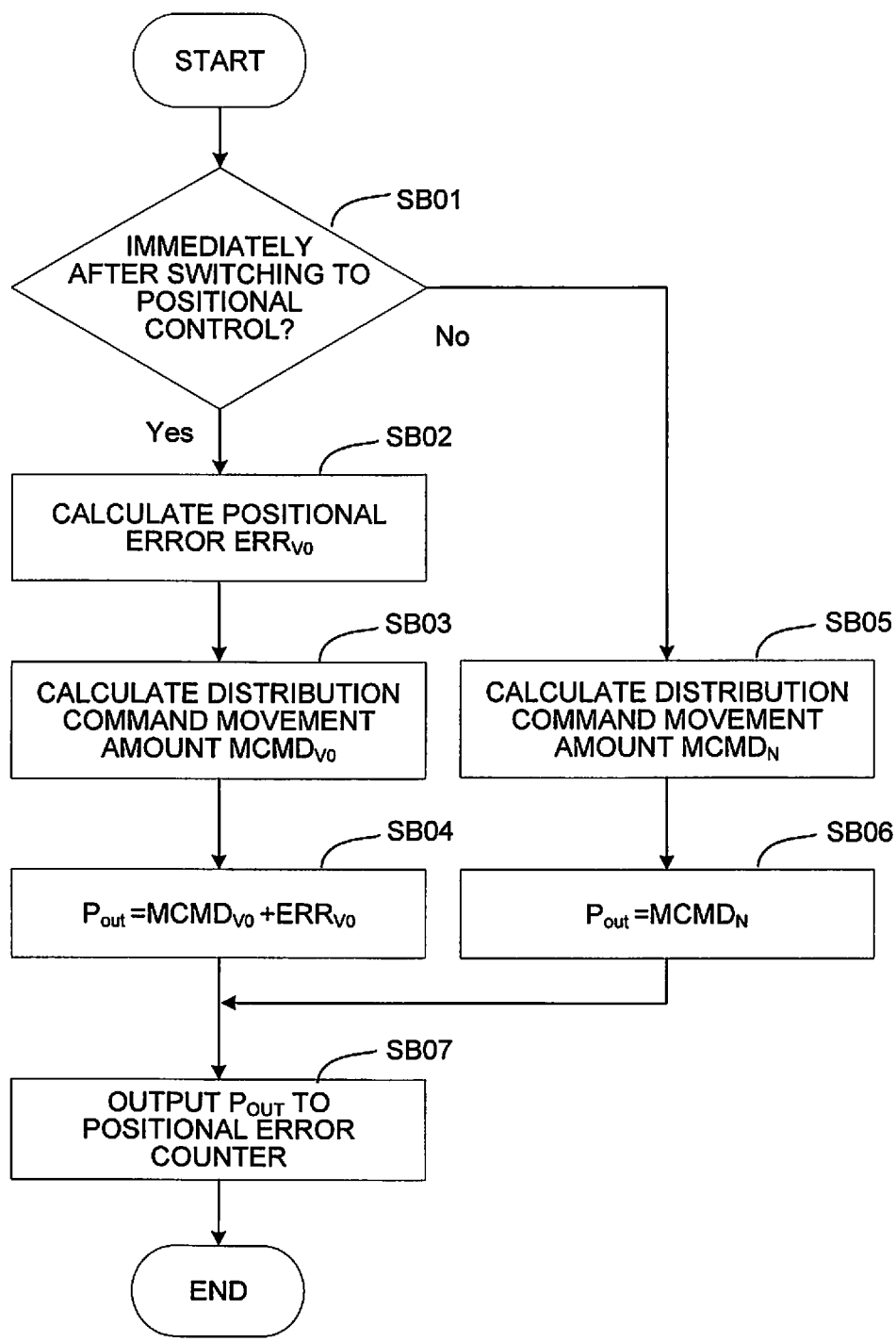

SERVO CONTROL DEVICE

RELATED APPLICATIONS

The present application claims priority to Japanese Patent Application Number 2015-227336, filed Nov. 20, 2015, the disclosure of which is hereby incorporated by reference herein in its entirety.

BACKGROUND OF THE INVENTION

1. Field of the Invention

The present invention relates to a servo control device, and in particular, relates to a servo control device that performs deceleration stop in a dead zone of an input command of an analogue input voltage.

2. Description of the Related Art

In control of a servo motor, depending on whether a circuit configuration of a control system is an analogue circuit or a digital circuit, the control is classified into control by an analogue servo and by a digital servo. The control by the digital servo is capable of performing highly precise control; however, to configure the digital servo control, it is necessary to ensure consistency in control codes or others in a digital control device or a servo amplifier, and therefore, suitability is restricted. In contrast thereto, as in the case of the analogue servo, when a speed command is issued by inputting an analogue input voltage, though it is difficult to perform control with high precision, since the speed command can be issued only by a voltage command, there is high versatility.

In such a numerical value control device that issues the speed command by inputting the analogue input voltage, it is difficult to precisely control a stop position of a motor; however, for example, in a technique disclosed by Japanese Patent Laid-Open No. 11-015531, the problem is solved by inputting a position keeping signal at rest to switch from the speed control to positional control, and by stopping at the position where the signal is inputted and keeping the position, to thereby stop at a stop position without mispositioning.

In the conventional art, since switching from the speed control to the positional control is performed when the position keeping signal is input to carry out the positional control for solving a positional error amount from the position of inputting the position keeping signal, a motor suddenly stops when the position keeping signal is inputted. Moreover, the larger the speed when the position keeping signal is inputted is, the more often the overshoot occurs; accordingly, there was a problem of occurrence of a mechanical shock.

SUMMARY OF THE INVENTION

Therefore, an object of the present invention is, in the control of the servo motor by the analogue input voltage, to provide a servo control device capable of suppressing shock caused by overshoot or a sudden stop.

In the present invention, in the speed command or torque command by inputting the analogue input voltage, there is provided a dead zone of the command voltage that is determined as stopping. Then, an acceleration or a deceleration is always calculated from speed feedback during the speed control or the torque control, and, when the command voltage enters the dead zone of the command voltage to be determined as stopping, position determination is performed to a stop position by switching to the positional control by a positional command that maintains the deceleration at the point in time.

Then, a servo control device according to an aspect of the present invention performs speed control or torque control for controlling speed or torque of a servo motor based on a speed command or a torque command by an analogue input voltage, and performs positional control for controlling a position of the servo motor based on feedback from the servo motor, includes a command switching unit determining that a command voltage of a command by the analogue input voltage enters a dead zone of the command voltage which is registered in advance and determined as stopping, and, when detecting that the command voltage enters the dead zone, the command switching unit ceases the speed control or the torque control, and switches a control method of the servo motor for causing the servo motor to perform deceleration stop by the positional control by distribution processing of a movement command regarding an actual speed when the speed control or the torque control is ceased as an initial speed.

The deceleration stop decelerates with a deceleration at a point of time when the command voltage enters the dead zone.

The deceleration stop decelerates by a time constant designated in advance.

Designation of the dead zone is changeable at any time by binary input.

According to the present invention, in the servo control device that performs the speed control or the torque control based on the speed command or the torque command by inputting the analogue input voltage, it is possible, when a deceleration command is issued, to stop while maintaining the preceding deceleration when a command by inputting the analogue input voltage enters the dead zone of the command voltage determined as stopping. Therefore, a shock caused by the overshoot or the sudden stop can be suppressed. Moreover, after stopping, the position can be kept as long as the command by inputting the analogue input voltage is within the range of the dead zone.

BRIEF DESCRIPTION OF THE DRAWINGS

The foregoing and other objects and features of the present invention will become apparent from the following description of the embodiment in connection with the accompanying drawings, wherein:

FIG. 4 shows a flowchart of distribution processing of a movement command issued by a positional command unit 13 in FIG. 1.

DETAILED DESCRIPTION OF THE PREFERRED EMBODIMENT

Hereinafter, an embodiment of the present invention will be described with reference to the accompanying drawings.

Figure 1:
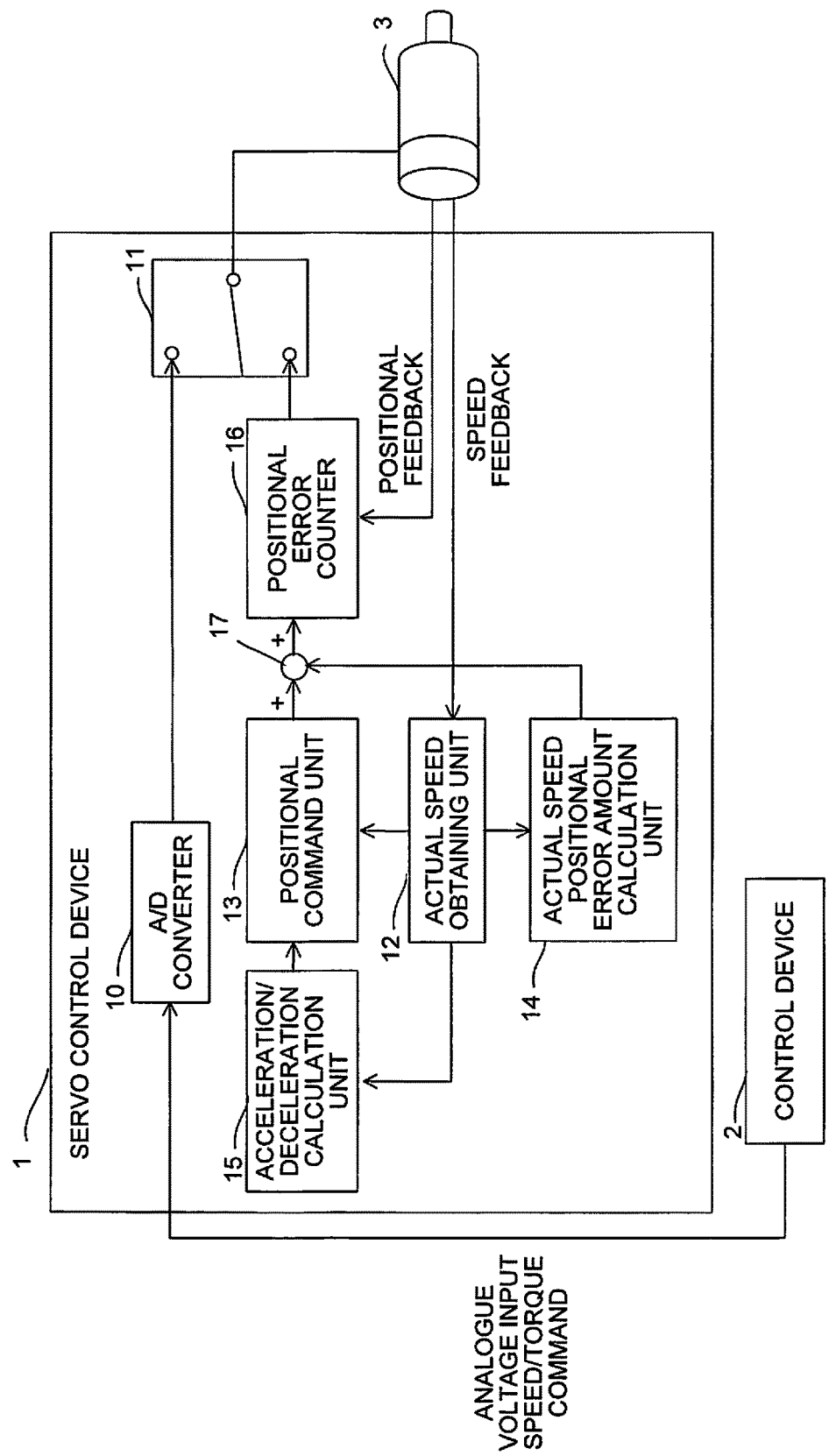
FIG. 1 is a block diagram showing a configuration of a servo control device according to an embodiment of the present invention.

FIG. 1 shows functions of the servo control device according to an embodiment of the present invention by a functional block diagram. The servo control device 1 includes a servo amplifier configuration that supplies a servo motor 3 with a driving current, and a command switching unit 11 that switches between the control by the speed command or the torque command and the control by a positional loop based on a value of a command voltage by inputting the analogue input voltage from a control device 2. Then, to perform the control by the positional loop that executes deceleration stop assuming an actual speed at a point in time of switching to the positional control as an initial speed, the servo control device 1 is newly supplemented with an actual speed obtaining unit 12, the positional command unit 13, an actual speed positional error amount calculation unit 14, an acceleration/deceleration calculation unit 15 and an adder-subtractor 17.

The servo control device 1 performs the speed control or the torque control upon receiving the speed command or the torque command by inputting the analogue input voltage from the control device 2, and forms a positional loop when the command by inputting the analogue input voltage enters the dead zone of the command voltage, which is registered as a parameter in advance and determined as stopping. After forming the positional loop, the distribution processing of the movement command is performed by the positional command unit 13 to stop with the actual speed at the time of switching regarded as the initial speed while maintaining the preceding deceleration. This makes it possible to smoothly perform deceleration stop when an input voltage of the speed command or the torque command by inputting the analogue input voltage enters the dead zone determined as stopping.

Moreover, in the positional control, it is also possible to perform the deceleration stop with an arbitrary deceleration by using a time constant or the like that can be arbitrarily set by a parameter.

Except for the purpose of performing the positional control in the deceleration stop, the distribution processing of the movement command executed by the positional command unit 13 is similar to distribution processing of a movement command executed by a commonly used control device. Therefore, a well-known processor required to execute the distribution processing may be incorporated into the servo control device 1, and the positional command unit 13 may be configured with the processor.

Note that, in the servo control device 1, as long as the input voltage of the speed command or the torque command by inputting the analogue input voltage is within the dead zone of the command voltage determined as stopping, the positional command to perform the deceleration stop is issued by the positional command unit 13; however, after the motor stops, since the speed command or the torque command of the analogue input voltage from the control device 2 is ignored while maintaining the positional loop, the stop position can be kept as long as the command voltage value is within the range of the dead zone.

Switching from the control mode by the positional loop to the control mode by the speed command or the torque command may be performed by changing a level of the dead zone of the command voltage determined as stopping by binary input of signals or the like. Consequently, it is possible to change the dead zone of the command voltage determined as stopping in the control mode by the positional loop in the dead zone of the command voltage determined as stopping, to thereby perform the servo control by switching to the speed control or the torque control by inputting the analogue input voltage ordered by the control device 2.

Figure 2:
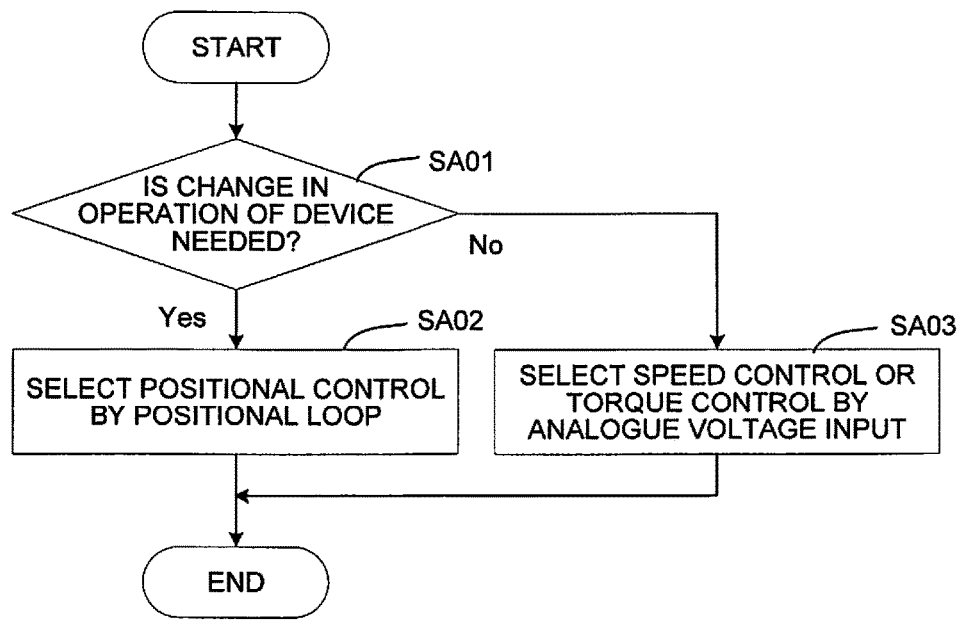
FIG. 2 is a flowchart showing processing executed by a command switching unit 11 in FIG. 1.

A description will be given of command switching processing in the command switching unit 11 based on the value of the command voltage by inputting the analogue input voltage from the control device 2 with reference to FIGS. 1 and 2. When the servo control device 1 according to the embodiment is used, an operator sets the dead zone of the command voltage determined as stopping to the command switching unit 11 in advance. The setting may be performed by the binary input of signals or the like as described above.

The command switching unit 11 of the servo control device 1 monitors the command voltage of the speed command or the torque command by inputting the analogue input voltage inputted from the control device 2 to the servo control device 1, and determines whether or not the value of the command voltage entered the dead zone set in the above and determined as stopping (Step SA01). Here, when it is determined that the value of the command voltage entered the dead zone determined as stopping, the command switching unit 11 of the servo control device 1 switches connection from the control device 2 side to a positional error counter 16 side, to thereby form a positional loop by the servo motor 3, a pulse coder (not shown), the actual speed obtaining unit 12, the acceleration/deceleration calculation unit 15, the positional command unit 13 and the positional error counter 16 (Step SA02). When the value of the command voltage did not enter the dead zone determined as stopping, the speed control or the torque control ordered by inputting the analogue input voltage inputted from the control device 2 is continued as-is (Step SA03).

Note that, during the control by the speed command or the torque command by inputting the analogue input voltage, the value of the positional error counter 16 is set to "0".

Figure 3:
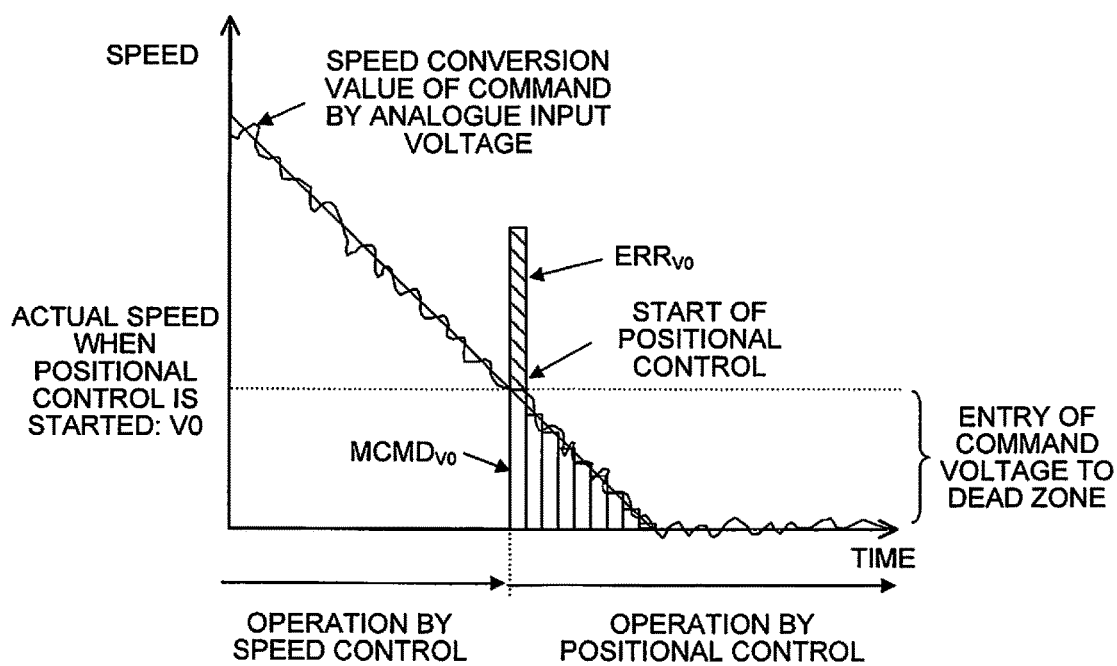
FIG. 3 is a diagram showing changes in a command movement amount when the control of the servo motor is switched to the positional control in the servo control device 1 in FIG. 1.

Next, a description will be given of the distribution processing of the movement command executed on the servo control device 1 after the input voltage of the command by inputting the analogue input voltage from the control device 2 to the servo control device 1 entered the dead zone determined as stopping with reference to FIGS. 1 and 3.

When the command voltage of the speed command or the torque command by inputting the analogue input voltage from the control device 2 enters the dead zone, the servo control device 1 starts the distribution processing of the movement command for performing the deceleration stop by switching from the speed control or the torque control by the speed command or the torque command to the positional control.

The actual speed obtaining unit 12 obtains speed feedback of the servo motor 3, and outputs thereof to the positional command unit 13, the acceleration/deceleration calculation unit 15 and the actual speed positional error amount calculation unit 14. The acceleration/deceleration calculation unit 15 calculates the acceleration/deceleration of the servo motor 3 and outputs thereof to the positional command unit 13. The positional command unit 13 calculates a distribution command movement amount MCMD for causing the servo motor 3 to perform the deceleration stop based on the acceleration/deceleration of the servo motor 3 obtained from the acceleration/deceleration calculation unit 15, and outputs thereof to the adder-subtractor 17. The positional error counter 16 adds the distribution command movement amount MCMD to the currently stored positional error amount, and subtracts a positional feedback amount from the pulse coder (not shown) provided to the servo motor 3, to thereby calculate a positional error. Then, based on the calculated positional error, the speed of the servo motor 3 is controlled.

The actual speed positional error amount calculation unit 14 calculates a positional error amount corresponding to the actual speed obtained by the actual speed obtaining unit 12 at the point in time when the speed command or the torque command by the analogue input voltage inputted from the control device 2 enters the dead zone of the command voltage determined as stopping, and the servo control device 1 switches the control to the positional control. In the adder-subtractor 17, the calculated positional error amount and the distribution command movement amount MCMD outputted from the positional command unit 13 are added, and outputted to the positional error counter 16.

The positional error amount corresponding to the actual speed in switching the control to the positional control, which is calculated by the actual speed positional error amount calculation unit 14, is obtained as follows. The positional error amount corresponding to the actual speed is calculated by the following Expression 1.

Positional error amount=speed/positional loop gain [Expression 1]

Here, if it is assumed that the speed feedback value when the positional control is started is V0 and the positional error amount corresponding to the actual speed when the positional control is started is $ERR_{V0}$, Expression 2 shown as follows holds, and the positional error amount corresponding to the actual speed when the control is switched to the positional control is calculated by the speed feedback value V0 when the positional control is started and a positional loop gain.

$ERR_{V0}=V0$/positional loop gain [Expression 2]

Moreover, if it is assumed that, of the distribution cycles after the control is switched to the positional control, the distribution command movement amount of the first distribution cycle when the positional control is started is $MCMD_{V0}$, a command value P0 outputted to the positional error counter 16 at the first distribution cycle when the control is switched to the positional control is calculated by the following Expression 3.

$P0=MCMD_{V0}+ERR_{V0}=MCMD_{V0}+V0$/positional loop gain

Then, in subsequent distribution cycles, the actual speed is regarded as the initial speed in the positional command unit 13, and the command movement amount subjected to deceleration processing with the deceleration at the point in time of switching to the positional control is ordered.

The distribution command movement amount MCMD is calculated by the positional command unit 13 to move with the deceleration calculated from the actual speed by the acceleration/deceleration calculation unit 15, and outputted to the positional error counter 16 via the adder-subtractor 17, to thereby perform positional control and decelerate the servo motor 3.

Moreover, if the positional command is continued with the deceleration at the time when the positional control is started, a sign of the distribution command movement amount MCMD is inverted. In the distribution cycle in which the sign of the distribution command movement amount MCMD is inverted, the positional command unit 13 ceases to output the positional command, and removes the positional error amount left in the positional error counter 16 to stop the servo motor 3.

Note that, in the subsequent distribution cycles, the command value $P_{out}$ is set to 0 as long as the command voltage value is within the range of the dead zone, and accordingly, the stop position is held by the positional control by the positional loop.

FIG. 4 is a flowchart of the process executed in each predetermined distribution cycle by the processor of the servo control device 1 during the period from switching from the control by the speed command or the torque command by inputting the analogue input voltage from the control device 2 to the positional control, to thereby stop the servo motor 3 in the embodiment.

[Step SB01] The positional command unit 13 determines whether or not the distribution cycle is the first distribution cycle immediately after switching from the control based on the command by inputting the analogue input voltage to the positional control. When the distribution cycle is the first distribution cycle immediately after switching, the process proceeds to Step SB02, and if it is not, the process proceeds to Step SB05.

[Step SB02] The positional command unit 13 calculates the positional error amount $ERR_{V0}$ corresponding to the speed V0 when the positional control is started.

[Step SB03] The positional command unit 13 calculates the distribution command movement amount $MCMD_{V0}$ in the first distribution cycle when the positional control is started.

[Step SB04] The positional command unit 13 adds the positional error amount $ERR_{V0}$ calculated in Step SB02 and the distribution command movement amount $MCMD_{V0}$ calculated in Step SB03, to thereby calculate the command value $P_{out}$ to be outputted to the positional error counter 16 (=the command value P0 to be outputted to the positional error counter 16 in the first distribution cycle), and the process proceeds to Step SB07.

[Step SB05] The positional command unit 13 calculates the distribution command movement amount $MCMD_N$ so that the servo motor 3 stops with an arbitrary deceleration.

For example, when the positional command is ordered to move while maintaining the deceleration DEC calculated by the acceleration/deceleration calculation unit 15 from the actual speed at the point in time when the control is switched to the positional control, the distribution command movement amount $MCMD_N$ distributed by the positional command unit 13 is calculated by the following Expression 4 assuming that the distribution command movement amount calculated in the preceding distribution cycle N-1 is $MCMD_{N-1}$.

If the positional command unit 13 continues to order the positional control to decelerate with the deceleration DEC when the positional control is started, the distribution command movement amount $MCMD_{N-1}$ in the preceding distribution cycle N-1 is gradually reduced, and finally, the deceleration DEC becomes the distribution command movement amount $MCMD_{N-1}$ in the preceding distribution cycle N-1 or more. In the distribution cycle, the positional command unit 13 cases to output the positional command, and sets the distribution command movement amount $MCMD_N$ to 0.

Note that the deceleration DEC when the positional control is started is updated only at the time when the control is switched to the positional control.

$$MCMD_N = \begin{cases} MCMD_{N-1} - DEC & \ldots MCMD_{N-1} > DEC \text{ holds} \\ 0 & \ldots MCMD_{N-1} \leq DEC \text{ holds} \end{cases}$$ [Expression 4]

[Step SB06] The positional command unit 13 regards the distribution command movement amount $MCMD_N$ calculated in Step SB05 as the command value $P_{out}$ to be outputted to the positional error counter 16, and the process proceeds to Step SB07.

[Step SB07] The positional command unit 13 outputs the command value $P_{out}$ calculated above to the positional error counter 16.

The description of an embodiment according to the present invention has been provided above; however, the present invention is not limited only to the above-described examples of the embodiment, and is able to be practiced in various modes by adding appropriate modifications.

What is claimed is:

1. A servo control device that performs speed control or torque control for controlling speed or torque based on a speed command or a torque command by an analogue input voltage, and performs positional control for controlling a position of a servo motor based on feedback from the servo motor, the servo control device comprising:
    a command switching unit determining that a command voltage of a command by the analogue input voltage enters a dead zone of the command voltage which is registered in advance and determined as stopping, wherein,
    when detecting that the command voltage enters the dead zone, the command switching unit ceases the speed control or the torque control, and switches, while the servo motor is ON, a control method of the servo motor for causing the servo motor to perform deceleration stop by the positional control by distribution processing of a movement command regarding an actual speed when the speed control or the torque control is ceased as an initial speed.

2. The servo control device according to claim 1, wherein designation of the dead zone is changeable at any time by binary input.

3. A servo control device that performs speed control or torque control for controlling speed or torque based on a speed command or a torque command by an analogue input voltage, and performs positional control for controlling a position of a servo motor based on feedback from the servo motor, the servo control device comprising:
    a command switching unit determining that a command voltage of a command by the analogue input voltage enters a dead zone of the command voltage which is registered in advance and determined as stopping,
    wherein, when detecting that the command voltage enters the dead zone, the command switching unit ceases the speed control or the torque control, and switches a control method of the servo motor for causing the servo motor to perform deceleration stop by the positional control by distribution processing of a movement command regarding an actual speed when the speed control or the torque control is ceased as an initial speed, and
    wherein the deceleration stop decelerates with a deceleration at a point of time when the command voltage enters the dead zone.

4. A servo control device that performs speed control or torque control for controlling speed or torque based on a speed command or a torque command by an analogue input voltage, and performs positional control for controlling a position of a servo motor based on feedback from the servo motor, the servo control device comprising:
    a command switching unit determining that a command voltage of a command by the analogue input voltage enters a dead zone of the command voltage which is registered in advance and determined as stopping,
    wherein, when detecting that the command voltage enters the dead zone, the command switching unit ceases the speed control or the torque control, and switches a control method of the servo motor for causing the servo motor to perform deceleration stop by the positional control by distribution processing of a movement command regarding an actual speed when the speed control or the torque control is ceased as an initial speed, and
    wherein the deceleration stop decelerates by a time constant designated in advance.

* * * * *